United States Patent [19]
Caren et al.

[11] Patent Number: 5,635,769
[45] Date of Patent: Jun. 3, 1997

[54] ADAPTABLE INTERFACE DEVICE FOR CONTROL OF VEHICLE ACCESSORY SYSTEMS USING A PLUG-IN RESISTOR ASSEMBLY

[75] Inventors: Barry L. Caren, Beverly Hills, Calif.; Norman E. Cook, Mooresville, N.C.; Douglas C. Zhao, San Gabriel, Calif.

[73] Assignee: Magnadyne Corporation, Compton, Calif.

[21] Appl. No.: 626,338

[22] Filed: Apr. 2, 1996

[51] Int. Cl.[6] .................................................. B60R 25/00
[52] U.S. Cl. ........................................ 307/10.2; 180/287
[58] Field of Search ............................... 307/9.1–10.8, 307/147; 361/833–835, 837, 642, 646, 630, 104; 180/287; 70/DIG. 46; 439/34–36, 507, 622, 620, 621; 370/85.1, 85.9, 85.11; 364/424.01, 424.03, 424.05, 423.098, 424.037, 424.045; 337/255, 256, 264, 231; 235/382.5, 492; 338/21

[56] References Cited

U.S. PATENT DOCUMENTS

| | | | |
|---|---|---|---|
| 3,735,312 | 5/1973 | Nagel | 361/104 |
| 3,909,767 | 9/1975 | Williamson et al. | 337/264 |
| 4,148,372 | 4/1979 | Schroeder | 70/DIG. 46 |
| 4,337,452 | 6/1982 | Kozacka et al. | 337/231 |
| 4,654,743 | 3/1987 | Ruehl et al. | 439/620 |
| 4,913,663 | 4/1990 | Siemon et al. | 439/507 |
| 4,945,335 | 7/1990 | Kimura et al. | 307/10.2 |
| 5,139,443 | 9/1992 | Armando | 439/620 |
| 5,236,234 | 8/1993 | Norman | 292/201 |
| 5,244,418 | 9/1993 | Gurley | 439/620 |
| 5,359,230 | 10/1994 | Namiki et al. | 307/10.1 |
| 5,418,516 | 5/1995 | Oh | 338/21 |
| 5,435,752 | 7/1995 | Siemon et al. | 439/620 |
| 5,440,177 | 8/1995 | Bellin et al. | 307/10.5 |
| 5,442,243 | 8/1995 | Bailey | 307/10.5 |
| 5,548,163 | 8/1996 | French | 307/10.2 |

*Primary Examiner*—Richard T. Elms
*Attorney, Agent, or Firm*—Brooks & Kushman P.C.

[57] ABSTRACT

An adaptable interface device comprising at least one quick-connect port and a signal supply circuit. The at least one quick-connect port receiving a plug-in resistive assembly. The plug-in resistive assembly comprising a housing, a resistor, and two blade terminals. Upon receiving an activation signal, the signal supply circuit and the plug-in resistive assembly operate in conjunction to produce a control signal to control a vehicle circuit.

7 Claims, 2 Drawing Sheets

5,635,769

ADAPTABLE INTERFACE DEVICE FOR CONTROL OF VEHICLE ACCESSORY SYSTEMS USING A PLUG-IN RESISTOR ASSEMBLY

TECHNICAL FIELD

This invention relates to an interface apparatus for aftermarket vehicle security systems and aftermarket vehicle control systems.

BACKGROUND ART

Aftermarket vehicle security systems and aftermarket vehicle control systems must be capable of operating in a variety of different vehicle makes and models. To achieve full operational performance, an aftermarket system must be capable of controlling specific electrical accessory functions. For example, power door lock operation is one electrical accessory function which is controlled by many aftermarket systems. To date, primarily two electrical power door lock designs have been utilized.

A single voltage level input signal may be used to control the operation of electrical accessory circuits. For example, a power door lock circuit would comprise one lock input wire and one unlock input wire from each door lock switch. When the door lock switch is moved to the lock position, a battery voltage control signal is transmitted via the lock input wire. When the door lock switch is moved to the unlock position, a battery voltage control signal is transmitted via the unlock input wire. To interface with this type of electrical environment, many aftermarket systems are designed to produce battery voltage control signals. These aftermarket systems produce the battery voltage control signal either by supplying a battery voltage or a ground to the appropriate circuit.

A multiple voltage level input signal may also be used to control the operation of electrical accessory circuits. In this design, control signals are multiplexed, i.e. multiple voltage levels are communicated on a single wire, and therefore a lesser number of input wires is required. For example, a multiplexed power door lock circuit may contain only one input signal wire from each door lock switch. When the door lock switch is moved to the unlock position, a 12 volt signal is transmitted via the input wire. When the door lock switch is moved to the lock position, a 6 volt signal is transmitted via that same single input wire.

In comparing the two designs, the multiplexed design has multiple control voltage levels transmitted via a single wire, while the non-multiplexed design has a single control voltage level which must be transmitted via multiple wires.

The multiplexing of electrical accessory circuits has created difficulties in adapting aftermarket systems to vehicles using a multiplexed design. Many present aftermarket systems produce only single voltage level outputs, however multiple voltage level control signals are required to operate multiplexed vehicle accessory circuits.

Currently, retrofitted wire harnesses have been used to adapt aftermarket systems to specific vehicle makes and models. The disadvantages of this practice are numerous. For example, this practice complicates the installation process, reduces production efficiency and quality, increases the number of required stock parts, and increases inventory costs.

SUMMARY OF THE INVENTION

An object of the present invention is to provide a universal interface apparatus which enables aftermarket vehicle security systems and aftermarket vehicle control systems capable of producing only single voltage level output signals to operate vehicle electrical accessory circuits requiring multiple voltage level control signals.

Another object of the present invention is to provide a universal interface apparatus for enabling a vehicular security system to control a vehicle circuit requiring a predetermined at least one of a plurality of control signal levels. The universal interface apparatus comprises a quick connect port which receives a plug-in resistive assembly for producing a selectable electrical resistance to accommodate control signal level requirements of the vehicle circuit. The universal interface apparatus also includes a signal supply circuit in electrical communication with the quick connect port and plug-in resistive assembly to produce a control signal which conforms with the control signal level requirements of the vehicle circuit.

According to another aspect of the invention, a universal interface apparatus is provided wherein a signal supply circuit is contained within a housing which defines a recess for fully containing the plug-in resistive assembly when it is secured within the quick connect port. The quick connect port is preferably located on an external surface of the housing.

According to another aspect of the invention each quick connect port includes a pair of pressure clip electrical receptacles for receiving the first and second terminals of the plug-in resistive assembly. According to another aspect of the invention a plug-in resistive assembly comprising a resistor provides an electrical resistance between the first terminal and the second terminal. A housing supports the resistor with a first blade terminal in electrical communication with the first terminal of the resistor and a second blade terminal in electrical communication with the second terminal of the resistor. The first blade terminal and the second blade terminal extend from the housing and are adapted to be received by the pressure clip receptacles.

These and other objects and advantages of the present invention will become more apparent to one of ordinary skill in the art in view of the attached drawings and detailed description of the invention.

BEST MODE FOR CARRYING OUT THE INVENTION

Figure 1:
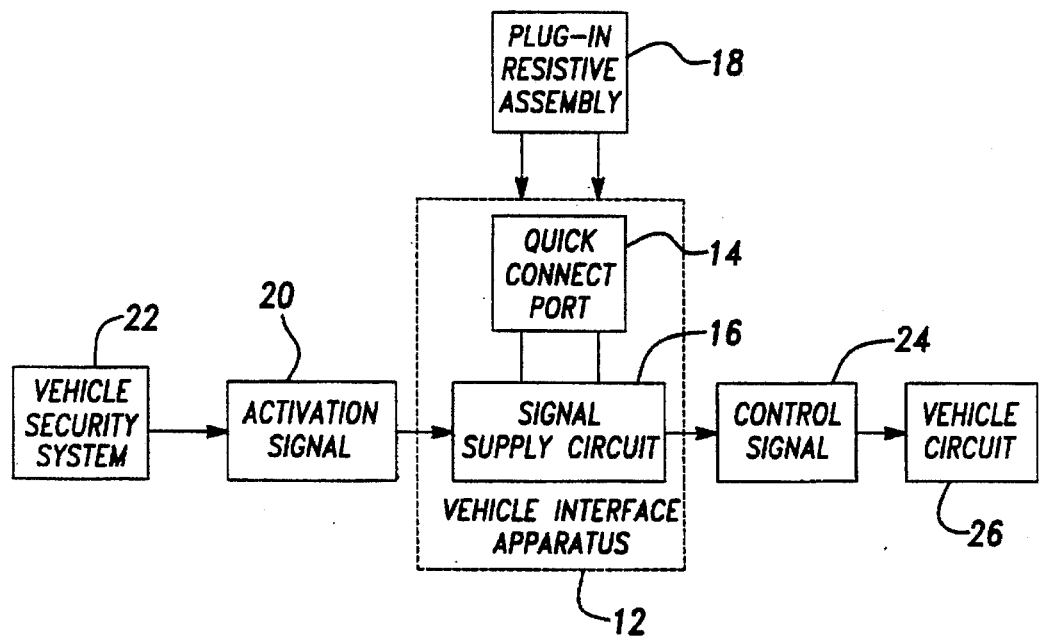
FIG. 1 is a block diagram of an embodiment of a universal interface apparatus in accordance with the present invention.

FIG. 1 illustrates a block diagram of an embodiment of a universal interface apparatus 12 in accordance with the present invention. The universal interface apparatus 12 comprises a quick connect port 14 and a signal supply circuit 16. The quick connect port 14 provides a communication path between a plug-in resistive assembly 18 and the signal supply circuit 16. The function of the universal interface apparatus 12 is to receive an activation signal 20, created by an aftermarket vehicle security or control system 22, and produce an appropriate control signal 24 to control a specific vehicle circuit 26. Although this block diagram illustrates that the universal interface apparatus 12 receives a single activation signal 20 and produces a single control signal 24, it is noted that more than one activation signal 20 may be received and more than one control signal 24 may be produced via this process at one time.

Figure 2:
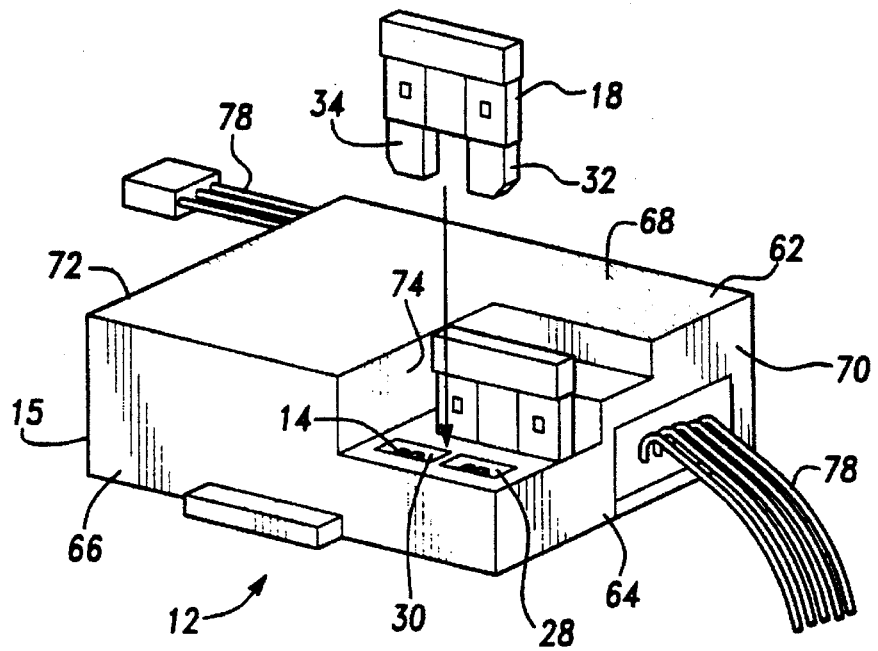
FIG. 2 is a perspective view of an embodiment of the universal interface apparatus.

As illustrated in FIG. 2, the quick connect port 14 is located on an external surface of the interface apparatus housing 15. The function of the quick connect port 14 is to provide a connecting means and a communication path between the plug-in resistive assembly 18 and the signal supply circuit 16. The quick connect port 14 comprises a first pressure clip receptacle 28 and a second pressure clip receptacle 30. The first pressure clip receptacle 28 and the second pressure clip receptacle 30 are spaced and located to receive a first blade terminal 32 and second blade terminal 34 of the plug-in resistive assembly 18. Each pressure clip receptacle 28 and 30 secures a fully inserted blade terminal 32 or 34. As such, the plug-in resistive assembly 18, when fully inserted in the quick connect port 14, will not disconnect without sufficient external force. The force exerted by the pressure clip receptacles 28 and 30 should be sufficient to physically and electrically maintain plug-in resistive assembly 18 within quick connect port 14 when subjected to vibrations, accelerations, etc. normally encountered in a vehicle while allowing removal of plug-in resistive assembly 18 when desired.

An interface apparatus 12 is comprised of one or more quick connect ports 14. FIG. 2 illustrates an interface apparatus 12 comprised of two quick connect ports 14. Preferably, multiple quick connect ports 14 are spaced to allow access to insert and remove multiple plug-in resistive assemblies 18.

As illustrated in FIG. 2, the signal supply circuit 16 is contained within a plastic interface housing 15. The interface housing 15 is preferably in the shape of a rectangular box. All components comprising the signal supply circuit 16 are contained entirely within the interface housing 15. The top surface 62, bottom surface 64, front surface 66 and back surface 68 of the interface housing 15 are solid. Each side surface 70 and 72 of the interface housing 15 contains an access for input/output wires 78.

The top surface of the housing 62 defines a recess surface 74 in which the quick connect port 14 is located. Openings in the recess surface 74 provide access to the pressure clip receptacles 28 and 30 of the quick connect port 14. Each pressure clip receptacle 28 and 30 is located sufficiently close to the external recess surface 74 such that the terminal blades 32 and 34 of the plug-in resistive assembly 18 may be fully seated. With a plug-in resistive assembly 18 fully seated in the quick connect port 14, the top of the plug-in resistive assembly housing 60 does not extend up beyond the top surface of the interface apparatus housing 62.

Figure 3:
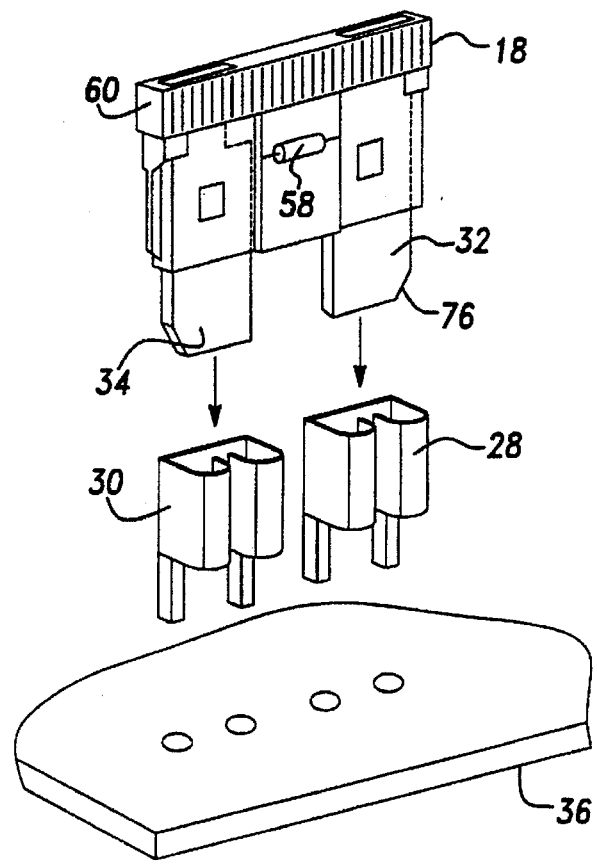
FIG. 3 is a perspective view of an embodiment of the plug-in resistive assembly.

As illustrated in FIG. 3, each pressure clip receptacle 28 and 30 is electrically and mechanically connected to the signal supply circuit 16 via a Printed Circuit Board (PCB) 36. When mounted to PCB 36, the pressure clip receptacles 28 and 30 are capable of withstanding longitudinal and latitudinal forces which arise when the blade terminals 32 and 34 of the plug-in resistive assembly 18 are inserted or removed from the pressure clip receptacles 28 and 30.

Pressure clip receptacles 28 and 30 have been selected as the connecting means to capitalize upon the ease and quickness with which the plug-in resistive assembly 18 may be inserted and removed from the quick connect port 14. Although pressure clip receptacles are employed in the present invention, other electrical and mechanical connecting means known to those skilled in the art may also be utilized.

As illustrated in FIG. 3, the plug-in resistive assembly 18 is comprised of a resistor 58, a housing 60, and two blade terminals 32 and 34. The function of the plug-in resistive assembly 18 is to provide a resistive element that may be quickly and easily installed and removed from the quick connect port 14.

The resistance of the plug-in resistive assembly 18 is based primarily upon the resistance value of the resistor 58 installed in the resistive assembly 18. Resistor 58 has two ends, one end is attached to blade terminal 32 and the opposite end is attached to blade terminal 34. The resistance of the blade terminals 32 and 34 is negligible. Resistive assemblies are to be manufactured with resistors of different values. These resistive values are selected in dependence upon the control signal level requirements of the vehicle circuit 26. Preferably, a one ohm resistor is the smallest resistance to be manufactured. Other values may include those which are representative of various vehicle systems 26 such as 1500 ohms and 249 ohms.

Each blade terminal 32 and 34 is made of a sufficiently rigid metal to prevent deformation or fracture of the terminal during installation and removal from a pressure clip terminal 28 and 30. The first blade terminal 32 and the second blade terminal 34 are located and spaced to insert into the first pressure clip receptacle 28 and second pressure clip receptacle 30 of the quick connect port 14. Each blade terminal 32 and 34 has a tapered end portion 76 to ease insertion into a pressure clip receptacle 28 or 30. Blade terminals 32 and 34 may be inserted in either orientation into pressure clip receptacles 28 and 30.

The housing 60 of the plug-in resistive assembly 18 supports the resistor 58 and blade terminals 32 and 34. The housing 60 is made of an electrically insulated material. The housing 60 is shaped such that it may be used as a gripping body during the installation and removal of the resistive assembly 18 from the quick connect port 14. The housing 60 is rigid and capable of withstanding the external longitudinal and latitudinal forces which occur during installation and removal of the resistive assembly 18.

Figure 4:
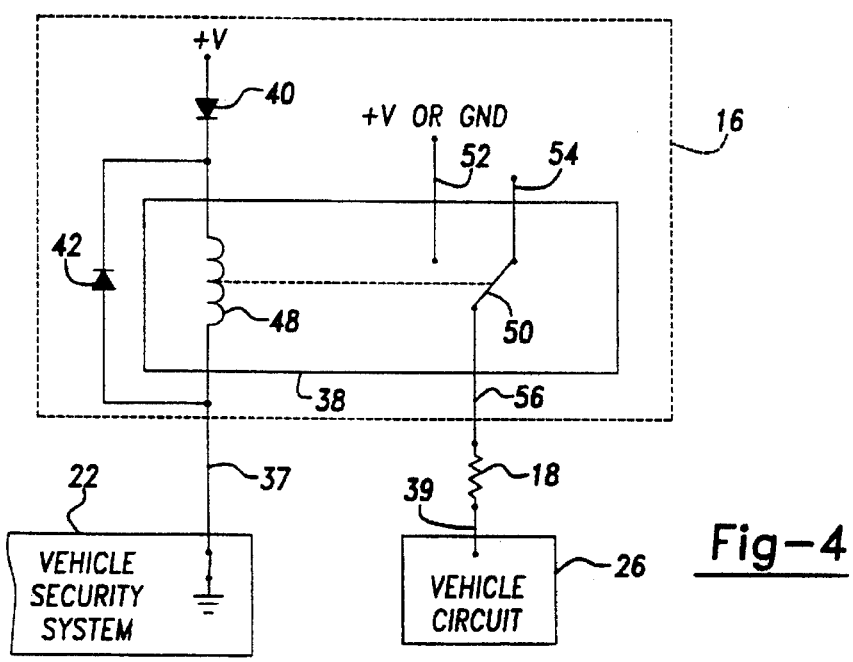
FIG. 4 is an electrical schematic of an embodiment of the signal supply circuit.

Signal supply circuit 16, as illustrated in FIG. 4, operates in conjunction with plug-in resistive assembly 18. Plug-in resistive assembly 18 operates as an interchangeable resistance placed in series with the signal supply circuit 16. The function of the signal supply circuit 16 is to receive an activation signal 20 on activation signal line 37 from the aftermarket vehicle security or control system 22 and in conjunction with plug-in resistive assembly 18 produce an appropriate control signal 24 on control signal line 39. The appropriate control signal 24 is determined from the control signal level requirements of the vehicle circuit 26.

FIG. 4 is an electrical schematic of the signal supply circuit 16 illustrating connections to plug-in resistive assembly 18, control signal line 39, vehicle circuit 26, activation signal line 37, and aftermarket vehicle security and control system 22. The signal supply circuit 16 consists of a relay 38 and two diodes 40 and 42. The activation signal 20 on activation signal line 37 from the aftermarket vehicle security or control system 22 is used to control the relay coil circuit, which in turn operates the relay switch 50.

The circuit includes a voltage source connection, two diodes 40 and 42, relay coil 48, activation signal line 37, and the aftermarket vehicle security or control system 22. The voltage feed is connected to the anode of diode 40. The cathode of diode 40 is connected to one end of relay coil 48. Connected to the opposite end of relay coil 48 is activation signal line 37. Activation signal line 37 is also connected to the aftermarket vehicle security or control system 22. Connected in parallel to the relay coil 48 is diode 42. The anode of diode 42 is attached to activation signal line 37 and the cathode is attached to the cathode of diode 40.

As illustrated in FIG. 4, a grounding output of the aftermarket vehicle security or control system 22 is used to control or complete the energized relay coil circuit. Alternatively, it should be noted that a voltage output of the aftermarket vehicle security and control system 22 could be used to control or complete a grounded relay coil circuit.

The relay switch circuit consists of a relay switch 50, polarity input 52, normally closed input 54, and relay switch output 56. When relay switch 50 is not energized, the normally closed input 54 is connected to the relay switch output 56. When relay switch 50 is energized, the polarity input 52 is connected to the relay switch output 56. Based on the requirements of the vehicle circuit 26, the polarity input 52 is attached to either a voltage feed or a ground.

To produce an appropriate control signal 24, some polarity inputs 52 may require signal level modification. Since the current draw of vehicle circuit 26 is relatively constant among operations, the amount of signal level modification which occurs is dependent upon the resistance of the plug-in resistive assembly 18. The resistance of the plug-in resistive assembly 18 operates in conjunction with the resistance of vehicle circuit 26 to form a voltage divider circuit. The resistance of the plug-in resistive assembly 18 must be selected in accordance with the voltage divider formula to produce the required control signal 24.

The relay switch output 56 is connected to either pressure clip receptacle 28 or 30 of plug-in resistive assembly 18. Vehicle circuit 26 is attached to the opposite pressure clip receptacle 28 or 30. The circuit is completed when plug-in resistive assembly 18 is installed in pressure clip receptacles 28 and 30.

While the best mode for carrying out the invention has been described in detail, those familiar with the art to which this invention relates will recognize various alternative designs and embodiments for practicing the invention as defined by the following claims.

What is claimed is:

1. A universal interface apparatus for enabling control of at least one multiplexed vehicular circuit from an aftermarket vehicle security/control system, the universal interface apparatus comprising:

a housing having at least one quick-connect port for receiving a first terminal and a second terminal of a plug-in resistive assembly, the plug-in resistive assembly having an electrical resistance selected in dependence upon a predetermined control signal level required to control the multiplexed vehicular circuit; and a signal supply circuit disposed within the housing in electrical communication with the at least one quick-connect port, the signal supply circuit receiving an activation signal from an aftermarket vehicle security/control system and producing at least one control signal to control the at least one multiplexed vehicular circuit.

2. The universal interface apparatus of claim 1 further comprising at least one removable plug-in resistive assembly secured within the at least one quick connect port.

3. The universal interface apparatus of claim 2 wherein the housing includes a recess which fully contains the plug-in resistive assembly when secured within the at least one quick-connect port.

4. The universal interface apparatus of claim 1 wherein the at least one quick connect port is located on an external surface of the housing.

5. The universal interface apparatus of claim 1 wherein the at least one quick-connect port includes a pair of electrical receptacles to receive the first terminal and the second terminal of the plug-in resistive assembly, the electrical receptacles having resilient contacts for securing the plug-in resistive assembly within the housing.

6. The universal interface apparatus of claim 1 wherein the aftermarket vehicle security/control system comprises a remote keyless entry system.

7. The universal interface apparatus of claim 1 wherein the aftermarket vehicle security/control system controls the vehicle door locks.

* * * * *